United States Patent [19]

Ingalsbe et al.

[11] Patent Number: 5,292,285
[45] Date of Patent: Mar. 8, 1994

[54] CROSS GROOVE CONSTANT VELOCITY JOINT CAGE HAVING ANGLED BALL RETANINING WINDOWS

[75] Inventors: Steven L. Ingalsbe; James W. Warnke, both of Toledo, Ohio

[73] Assignee: Dana Corporation, Toledo, Ohio

[21] Appl. No.: 889,166

[22] Filed: May 27, 1992

[51] Int. Cl.$^5$ .................................. F16D 3/227
[52] U.S. Cl. ........................... 464/144; 464/906
[58] Field of Search ............... 464/139, 141–146, 464/906

[56] References Cited

U.S. PATENT DOCUMENTS

| | | |
|---|---|---|
| 2,047,660 | 7/1936 | Anderson . |
| 3,069,874 | 12/1962 | Leto . |
| 3,133,432 | 5/1964 | Mazziotti . |
| 3,186,189 | 6/1965 | Cull . |
| 3,789,624 | 2/1974 | Camosso ............... 464/906 X |
| 4,202,184 | 5/1980 | Krude et al. . |
| 4,511,346 | 4/1985 | Hazebrook et al. . |
| 4,573,947 | 3/1986 | Hazebrook et al. . |

Primary Examiner—Daniel P. Stodola
Assistant Examiner—William G. Battista, Jr.
Attorney, Agent, or Firm—MacMillan, Sobanski & Todd

[57] ABSTRACT

A cross groove variety of constant velocity universal joint includes an inner race having a plurality of grooves formed in an outer surface thereof and an outer race having a plurality of grooves formed in an inner surface thereof. For each pair of associated inner and outer race grooves, the inner race groove is inclined in one direction relative to the rotational axis of the joint, while the outer race groove is inclined in the opposite direction. A ball is disposed in each of the associated inner and outer race grooves for providing a driving connection between the inner and outer races. A cage is provided with openings for retaining the balls in the grooves. The cage openings are formed having angled side walls which open up toward the center of the joint. The angled side walls are effective to position the point of contact between the balls and the angled side walls away from a lower edge surface of the cage. Consequently, an inner bore radius of the cage can be increased to allow greater angular motion and axial movement of the joint. Also, the balls are pinched against the angled side walls during operation of the joint to prevent the cage from chattering.

5 Claims, 2 Drawing Sheets

CROSS GROOVE CONSTANT VELOCITY JOINT CAGE HAVING ANGLED BALL RETANINING WINDOWS

BACKGROUND OF THE INVENTION

This invention relates in general to universal joints and in particular to an improved structure for a constant velocity type of universal joint.

A universal joint is a mechanical coupling device which provides a rotational driving connection between two rotatable shafts, while permitting such shafts to be oriented at an angle relative to one another. Universal joints are commonly used in the drive train systems of vehicles. For example, a universal joint is commonly used to provide a rotational driving connection between a drive shaft rotatably driven by a vehicle engine and an input shaft connected to the vehicle axle assembly. This is because the drive shaft and the axle assembly input shaft are rarely co-axially aligned. To accommodate this non-alignment, while still providing a rotational driving connection, a universal joint is utilized therebetween.

Universal joints are commonly classified by their operating characteristics. One important operating characteristic relates to the relative angular velocities of the two shafts connected thereby. In a constant velocity type of universal joint, the instantaneous angular velocities of the two shafts are always equal, regardless of the angular orientation of the shafts. In a non-constant velocity type of universal joint, the instantaneous angular velocities of the two shafts vary with the angular orientation of the shafts (although the average angular velocities for a complete revolution are equal).

A typical constant velocity universal joint includes a cylindrical inner race connected to one of the shafts and a hollow cylindrical outer race connected to the other of the shafts. The outer surface of the inner race and the inner surface of the outer race have respective pluralities of grooves formed therein. The grooves extend linearly, having generally semi-circular cross sectional shapes. Each groove formed in the outer surface of the inner race is associated with a corresponding groove formed in the inner surface of the outer race. A ball is disposed in each of the associated pairs of grooves. The balls provide a driving connection between the inner and outer races. A generally hollow cylindrical cage is typically provided between the inner and outer races for retaining the balls in the grooves. The cage has circumferentially extending inner and outer surfaces and a plurality of openings formed therethrough for receiving and retaining the balls.

In one known type of constant velocity joint, the grooves formed in the outer surface of the inner race are oriented so as to be alternately inclined relative to the rotational axis of the joint. Similarly, the grooves formed in the inner surface of the outer race are also alternately inclined relative to the rotational axis of the joint. For each pair of associated inner and outer race grooves, the inner race groove is inclined in one direction relative to the rotational axis of the joint, while the outer race groove is inclined in the opposite direction. Thus, this type of joint is commonly referred to as a cross groove constant velocity joint or, more simply, a cross groove joint.

Most cross groove joints permit the inner race and its associated shaft to move axially relative to the outer race and its associated shaft. Thus, the center point of the inner race (i.e., the point defined by the intersection of the axis of rotation of the inner race with a perpendicular plane bisecting the inner race) can be axially displaced from center point of the outer race. This axial displacement is desirable because it permits the two shafts to move axially relative to one another during operation.

However, it has been found that the ability of the cross groove joint to accommodate angular movement between the two shafts is inversely related to the ability of the joint to accommodate axial movement therebetween. In other words, as the center points of the two races are displaced at a greater distance, the joint can accommodate a lesser amount of relative angular movement therebetween. For example, a typical joint may accommodate an angular orientation of 18.0° between the two shafts when the center points of the inner and outer races are displaced by 14.7 mm. The same joint will accommodate only an angular orientation of 6.0° when such center points are displaced by 24.0 mm.

This inverse relationship between the angular movement and axial displacement of the inner and outer races is a result of the internal structure of the cross groove joint. Specifically, it has been found that when the center point of the inner race is axially displaced from the center point of the outer race, angular movement of the inner race causes the center point thereof to move laterally with respect to the center point of the outer race. As a result, the center point of the inner race moves out of alignment with the axis of rotation of the outer race. Consequently, angular movement of the inner race causes the outer surface thereof to engage the inner surface of the cage, preventing further angular movement. The ratio of this lateral movement of the center point of the inner race to the amount of angular movement increases with the amount of axial displacement of the center points of the inner and outer races. Thus, as the center points of the inner and outer races are displaced at a greater distance, the joint can accommodate a lesser amount of relative angular movement therebetween.

It is known to design cross groove joints to meet the specific angular movement and axial displacement requirements of a particular application. This is usually accomplished by enlarging the entire joint structure to accommodate both greater angular movements and axial displacements than would otherwise be available. However, it would be desirable to provide an improved structure for a cross groove joint which can accommodate both greater angular movements and axial displacements than previously attainable without increasing the overall size thereof.

SUMMARY OF THE INVENTION

This invention relates to an improved structure for a cross groove constant velocity universal joint which can accommodate both greater angular movements and axial displacements than previously attainable with comparably sized cross groove joints. The joint includes an inner race having a plurality of outer grooves, an outer race having a plurality of inner grooves, and a ball disposed in each of the associated pairs of grooves. For each pair of race grooves, the inner race groove is inclined in one direction relative to the rotational axis of the joint, while the outer race groove is inclined in the opposite direction. A hollow cylindrical cage is provided between the inner and outer races. The cage has openings formed therethrough which receive the balls therein to retain them in the grooves. The diameter of the inner surface of the cage is enlarged to accommodate lateral movement of the center point of the inner race when it is moved both axially and angularly relative to the outer race. The ball retaining openings are formed having side walls which are angled relative to a plane bisecting the cage. The side walls taper toward one another from the inner surface of the cage to the outer surface thereof. The angled side walls position the points of contact of the balls a sufficient distance away from the edges of the openings to prevent damage during operation. In addition, the angled side walls engage the balls to prevent the cage from chattering during operation.

Various objects and advantages of this invention will become apparent to those skilled in the art from the following detailed description of the preferred embodiments, when read in light of the accompanying drawings.

DETAILED DESCRIPTION OF THE PREFERRED EMBODIMENT

Figure 1:
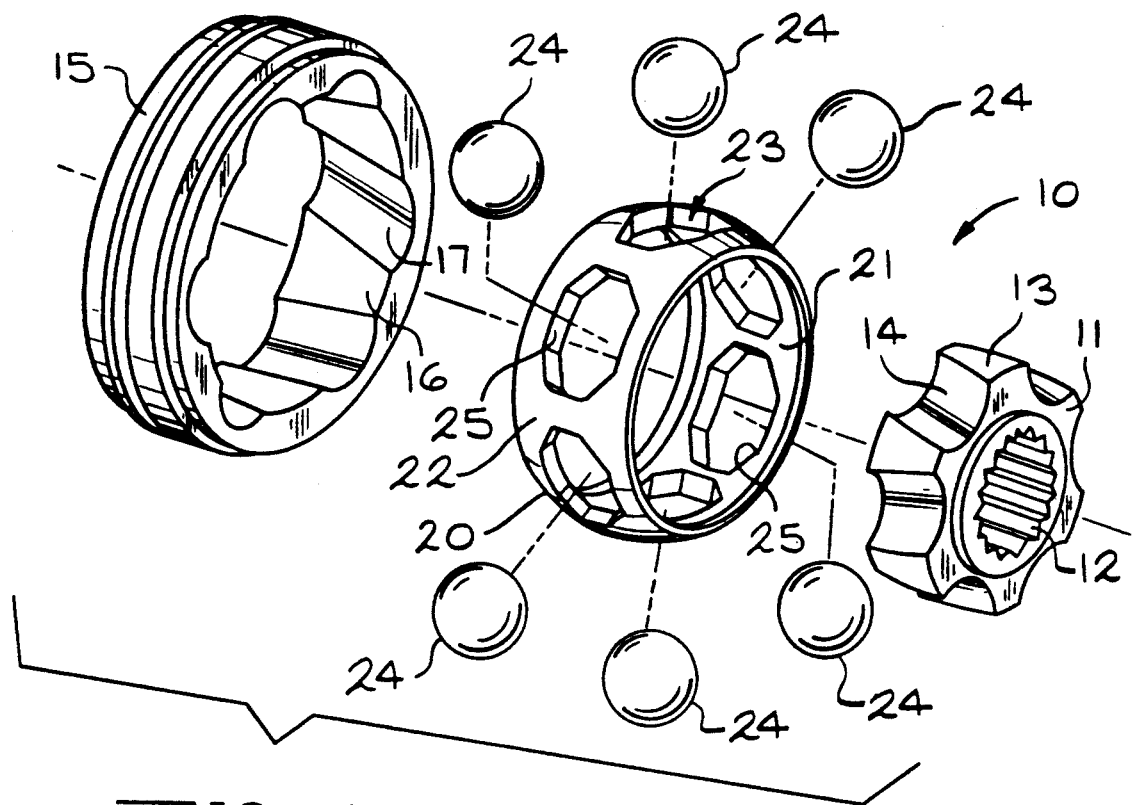
FIG. 1 is an exploded perspective view of a prior art constant velocity universal joint.
Figure 2:
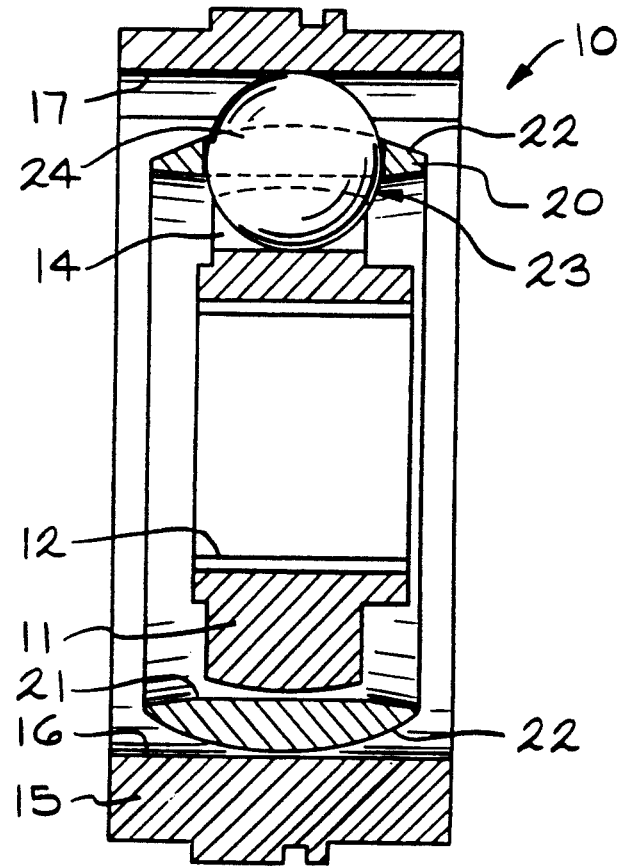
FIG. 2 is a sectional elevational view of the prior art constant velocity joint of FIG. 1 shown assembled.
Figure 3:
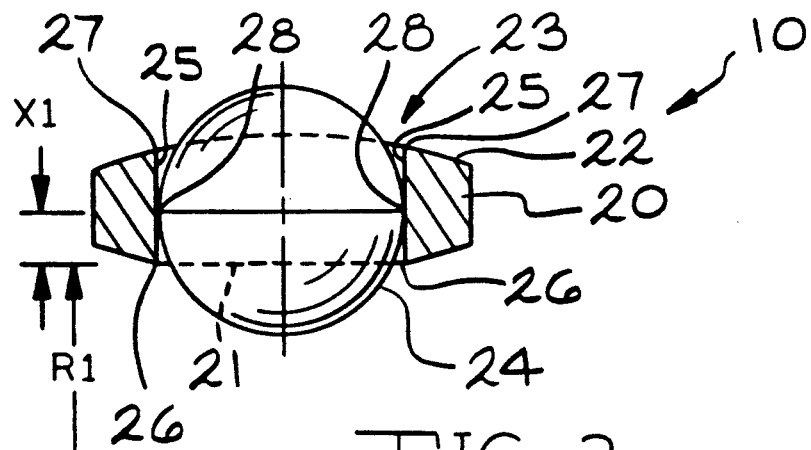
FIG. 3 is an enlarged sectional elevational view of a portion of the prior art constant velocity joint of FIG. 2.

Referring now to the drawings, there is illustrated in FIGS. 1, 2, and 3 a prior art cross groove constant velocity universal joint, indicated generally at 10, in accordance with this invention. The prior art joint 10 includes an inner race 11 which is generally hollow and cylindrical in shape, defining an axis of rotation therethrough. The inner race 11 has a central splined opening 12 formed therethrough. The splined opening 12 is adapted to receive a splined end of a first shaft (not shown) for rotation therewith in a known manner.

The inner race 11 has an outer surface 13 which is generally cylindrical in shape, but which is slightly curved along the axis of rotation (as best shown in FIG. 2). A plurality of grooves 14 are formed in the outer surface 13 of the inner race 11. In the illustrated embodiment, six of such grooves 14 are formed in the outer surface 13, although a greater or lesser number may be provided. The grooves 14 extend linearly, each having a generally semi-elliptic or gothic cross sectional shapes. The grooves 14 are alternately inclined relative to the rotational axis of the inner race 11.

The prior art joint 10 further includes an outer race 15 which is also generally hollow and cylindrical in shape, defining an axis of rotation therethrough. The outer race 15 is adapted to be connected to a second shaft (not shown) for rotation therewith in a known manner. The outer race 15 has an inner surface 16 which is generally cylindrical in shape. A plurality of grooves 17 are formed in the inner surface 16 of the outer race 15. The number of such grooves 17 is the same as the number of grooves 14 formed in the outer surface 13 of the inner race 11.

As with the inner race grooves 14, the outer race grooves 17 extend linearly and have generally semi-elliptic or gothic cross sectional shapes. The grooves 17 are alternately inclined relative to the rotational axis of the outer race 15. Each of the outer race grooves 17 is associated with a corresponding one of the inner race grooves 14. For each of the pairs of inner and outer race grooves 14 and 17, the inner race groove 14 is inclined in one direction relative to the rotational axis of the joint, while its associated outer race groove 17 is inclined in the opposite direction.

A generally hollow cylindrical cage 20 is disposed between the outer surface 13 of the inner race 11 and the inner surface 16 of the outer race 15. The cage 20 is formed having an inner surface 21 which is generally cylindrical in shape and an outer surface 22 which is generally spherical in shape. A plurality of openings, each indicated generally at 23, is formed about the circumference of the cage 20. Each of the openings 23 extends radially from the inner surface 21 to the outer surface 22. A ball 24 is disposed within each of the openings 23. As best shown in FIG. 2, each ball 24 extends partially into each of the associated alternately inclined grooves 14 and 17 formed in the inner and outer races 11 and 15, respectively. As a result, a driving connection is provided between the inner and outer races 11 and 15, while relative angular movement and axial displacement is permitted therebetween.

Referring now to FIG. 3, the structure of the cage 20 of the prior art joint 10 is illustrated in detail. As shown therein, each of the openings 23 formed through the cage 20 is defined, in part, by a pair of opposed side walls 25. The side walls 25 extend from respective inner corner edges 26 (defined at the intersections of the side walls 25 with the inner surface 21) to respective outer corner edges 27 (defined at the intersections of the side walls 25 with the outer surface 22). The side walls 25 are oriented parallel relative to a perpendicular plane bisecting the cage 20. Thus, the distance separating the inner corner edges 26 is equal to the distance separating the outer corner edges 27.

As previously mentioned, a ball 24 is disposed within each of the openings 23. As shown in FIG. 3, the ball 24 engages each of the side walls 25 at a point of contact 28. The cage 20 is designed such that the points of contact 28 are located a predetermined distance away from the inner corner edges 26. This is done to prevent such inner corner edges 26 from becoming chipped or otherwise damaged during operation of the joint 10. In the embodiment illustrated in FIG. 3, R1 represents a radius which extends from the rotational axis of the joint 10 to the inner corner edges 26, and X1 represents the distance between the inner corner edges 26 and the points of contact 28. In a typical prior art joint 10, the radial distance R1 can be approximately 1.270 inches, while the radial distance X1 can be approximately 0.040 inch.

As discussed above, the ability of the prior art joint 10 to accommodate angular movement between the inner race 11 and the outer race 15 is inversely related to the ability of the joint 10 to accommodate axial movement therebetween. This occurs because the center point of the inner race 11 moves laterally with respect to the center point of the outer race 15 when the inner race 11 is axially and angularly displaced from the outer race 15. Consequently, the outer surface 13 of the inner race 11 engages the inner surface 21 of the cage 20, preventing further angular movement. Thus, it would be desirable to provide an improved structure for a constant velocity joint 10 which permits increased the axial and angular movements, while not increasing the overall size thereof.

Figure 4:
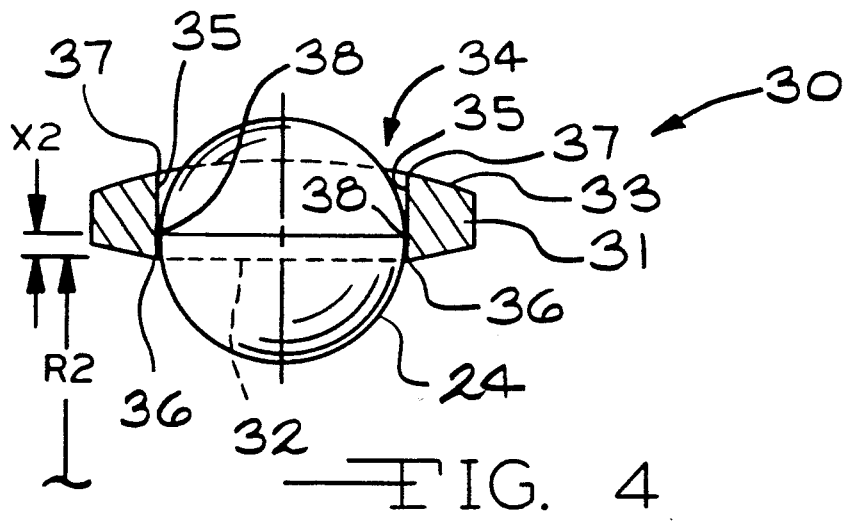
FIG. 4 is a view similar to FIG. 3 showing a first embodiment of an improved constant velocity joint in accordance with this invention.

Referring now to FIG. 4, there is illustrated a portion of a first embodiment of an improved constant velocity joint, indicated generally at 30, in accordance with this invention. The joint 30 is similar to the prior art joint 10 described above, except that the prior art cage 20 has been replaced by an improved cage, indicated generally at 31. The cage 31 is formed having an inner surface 32 which is generally cylindrical in shape and an outer surface 33 which is generally spherical in shape. A plurality of openings, each indicated generally at 34, is formed about the circumference of the cage 31. Each of the openings 34 extends radially from the inner surface 32 to the outer surface 33. A ball 24 is disposed within each of the openings 34.

Each of the openings 34 formed through the cage 31 is defined, in part, by a pair of opposed side walls 35. The side walls 35 extend from respective corner edges 36 (defined at the intersections of the side walls 35 with the inner surface 32) to respective corner edges 37 (defined at the intersections of the side walls 35 with the outer surface 33). As with the prior art cage 20, the side walls 35 of the cage 31 are oriented parallel relative to a perpendicular plane bisecting the cage 31. Thus, the distance separating the inner corner edges 36 is equal to the distance separating the outer corner edges 37.

As shown in FIG. 4, the ball 24 engages each of the side walls 35 at a point of contact 38. In the embodiment illustrated in FIG. 4, R2 represents a radius which extends from the rotational axis of the joint 30 to the inner corner edges 36, and X2 represents the distance between the inner corner edges 36 and the points of contact 38. To accommodate the increased axial and angular movement, the radial distance R2 of the improved joint 30 is greater than the radial distance R1 of the prior art joint 10. For example, the radial R2 can be approximately 1.290 inches. As a result, the inner race of the improved joint 30 is permitted an additional lateral movement of approximately 0.040 inch, resulting in a significant increase in the axial and angular capability of the joint 30.

If the radial distance R2 is increased by 0.020 inch, the radial distance X2 will be reduced by a similar amount. Thus, the radial distance X2 separating the inner corner edges 36 from the points of contact 38 will be reduced to approximately 0.020 inch. While this may function adequately in some situations, it has been found that this is not a sufficient distance to prevent the balls 24 from chipping or otherwise damaging the inner corner edges 36 during operation of the joint 30. Thus, it would be desirable to provide a further improved structure for the joint 30 which not only permits increased the axial and angular movements, but also prevent the inner corner edges from becoming damaged.

Figure 5:
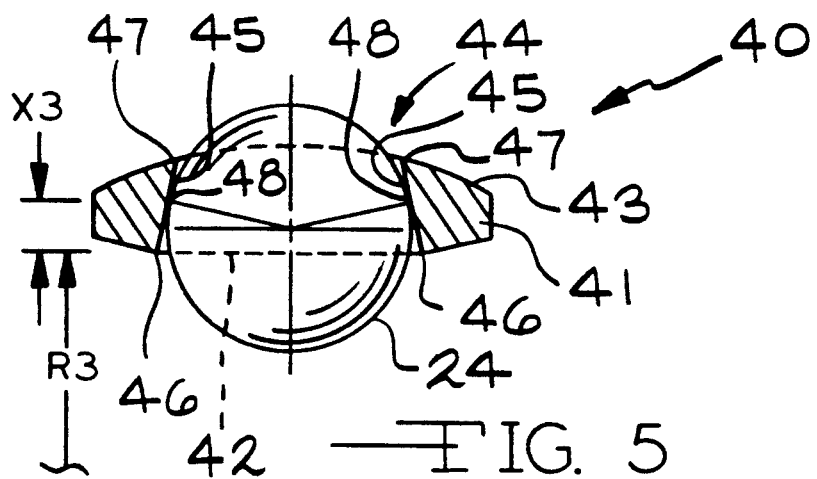
FIG. 5 is a view similar to FIG. 4 showing a second embodiment of an improved constant velocity joint in accordance with this invention.

Referring now to FIG. 5, there is illustrated a portion of a second embodiment of an improved constant velocity joint, indicated generally at 40, in accordance with this invention. The joint 40 is similar to the joint 30 described above, except that the cage 31 has been replaced by a further improved cage, indicated generally at 41. The cage 41 is formed having an inner surface 42 which is generally cylindrical in shape and an outer surface 43 which is generally spherical in shape. A plurality of openings, each indicated generally at 44, is formed about the circumference of the cage 41. Each of the openings 44 extends radially from the inner surface 42 to the outer surface 43. A ball 24 is disposed within each of the openings 44.

Each of the openings 44 formed through the cage 41 is defined, in part, by a pair of opposed side walls 45. The side walls 45 extend from respective corner edges 46 (defined at the intersections of the side walls 45 with the inner surface 42) to respective corner edges 47 (defined at the intersections of the side walls 45 with the outer surface 43). Unlike the prior art cage 20 or the cage 31, the side walls 45 of the cage 41 are not oriented parallel relative to a perpendicular plane bisecting the cage 41. Rather, such side walls 45 are oriented at an angle relative to a perpendicular plane bisecting the cage 41. Thus, the distance separating the inner corner edges 46 is greater than the distance separating the outer corner edges 47. For example, the side walls 45 may be oriented at an angle of approximately 7° relative to a perpendicular plane bisecting the cage 41.

As shown in FIG. 5, the ball 24 engages each of the side walls 45 at a point of contact 48. In the embodiment illustrated in FIG. 5, R3 represents a radius which extends from the rotational axis of the joint 40 to the inner corner edges 46, and X3 represents the distance between the inner corner edges 46 and the points of contact 48. The radial distance R3 of the further improved joint 40 is equal to the radial distance R2 of the improved joint 30. Thus, the joint 40 permits the same increased axial and angular capabilities as the joint 30.

However, the distance X3 is significantly greater than the radial distance X2. For example, depending upon the magnitude of the angular orientation of the side walls 35, the distance X3 may be approximately 0.040 inch or greater. This increased distance of separation between the inner corner edges 46 and the points of contact 48 insures that the balls 24 will not damage such inner corner edges 46 during operation of the joint 40.

The important features of this embodiment of the invention, therefore, are that angled side walls 45 of the cage 41 permit the radius of the inner surface 42 of the cage 41 to be increased, thus permitting increased axial and angular capabilities in the joint 40. At the same time, the angled side walls 45 are effective to locate the points of contact 48 a sufficient distance away from the inner corner edges 46 to prevent the inner corner edges 46 from becoming damaged during operation of the joint 40. Additionally, it has been found that as the operating angle of the joint 40 varies and the balls 24 are continuously re-positioned within the cage 41 by the inner and outer races, the angled side walls 45 tend to pinch the balls 24, preventing the cage 41 from moving. As a result, chattering of the cage 41 during operation is prevented.

In accordance with the provisions of the patent statutes, the principle and mode of operation of this invention have been described and illustrated in its preferred embodiments. However, it must be understood that the invention may be practiced otherwise than as specifically explained and illustrated without departing from its spirit or scope.

We claim:

1. A cross groove constant velocity universal joint comprising:
   a hollow outer race defining an axis of rotation, said outer race including an inner surface having a plurality of grooves formed therein, said outer race grooves being alternately inclined relative to said axis of rotation;

an inner race disposed within said outer race, said inner race including an outer surface having a plurality of grooves formed therein, said inner race grooves being alternately inclined relative to said axis of rotation, each of said inner race grooves being associated with one of said outer race grooves, said associated inner and outer race grooves being inclined in opposite directions relative to said axis of rotation;

a hollow cage disposed between said inner and outer races, said cage including an inner surface, an outer surface, and a plurality of openings formed therethrough between said inner and outer surfaces, each of said openings including a pair of side walls which intersect with said inner surface at respective inner corner edges and which intersect with said outer surface at respective outer corner edges, said side walls being angled relative to a plane bisecting said cage; and a ball disposed in each of said openings and in each of said associated inner and outer race grooves, said balls engaging said side walls at points of contact which are intermediate of said inner and outer corner edges.

2. The invention defined in claim 1 wherein said side walls of said cage are each oriented at an angle of approximately 7° relative to said plane bisecting said cage.

3. The invention defined in claim 1 wherein the distance separating said inner corner edges is greater than the distance separating said outer corner edges.

4. The invention defined in claim 3 wherein said outer surface of said cage is generally spherical in shape.

5. The invention defined in claim 3 wherein said inner surface of said cage is generally cylindrical in shape.

* * * * *